United States Patent [19]

Berrada et al.

[11] Patent Number: 5,953,321
[45] Date of Patent: Sep. 14, 1999

[54] TRANSMISSION CONTROL METHOD BETWEEN A PLURALITY OF STATIONS AND CORRESPONDING COMMUNICATION STATIONS

[75] Inventors: Marouane Berrada, Saint-Maur-des-Fosses; Américo Brajal, Villeneuve-le-Roi; Héba Koraitim, Paris, all of France

[73] Assignee: U.S. Philips Corporation, New York, N.Y.

[21] Appl. No.: 08/815,242

[22] Filed: Mar. 12, 1997

[30] Foreign Application Priority Data

Mar. 18, 1996 [EP] European Pat. Off. .............. 96400552
Dec. 3, 1996 [EP] European Pat. Off. .............. 96402611

[51] Int. Cl.[6] .................................................. H04L 12/413
[52] U.S. Cl. ............................................ 370/322; 370/447
[58] Field of Search .................................... 370/321, 322, 370/326, 343, 337, 346, 348, 443, 444, 445, 449, 459; 340/825.07, 825.08

[56] References Cited

U.S. PATENT DOCUMENTS 4,574,378 3/1986 Kobayashi .............................. 370/322
4,641,304 2/1987 Raychaudhuri ........................ 370/447

Primary Examiner—Chau Nguyen
Assistant Examiner—Phuongchau Ba Nguyen
Attorney, Agent, or Firm—Dicran Halajian

[57] ABSTRACT

A communication protocol is disclosed where unsuccessful transmissions between stations are reduced. Each station includes a first queue for receiving newly generated messages and a second queue for receiving recycled messages which were not successfully transmitted. A detector in a reception sub-assembly of each station detects that the number of unsuccessful transmissions or collisions exceeds a predetermined threshold. Until the collisions are solved, a recycling circuit recycles the collided messages by providing them to the second queue and increasing their transmission priority over any newly generated messages contained in the first queue.

5 Claims, 2 Drawing Sheets

TRANSMISSION CONTROL METHOD BETWEEN A PLURALITY OF STATIONS AND CORRESPONDING COMMUNICATION STATIONS

FIELD OF THE INVENTION

The present invention relates to a method of controlling the transmission of messages between a plurality of stations, said stations being interconnected via a communication channel comprising at least an upstream channel at least partially shared by said stations and said upstream channel being divided into successive frames of predetermined length consisting of message slots, each of which includes a data part, for the transmission of at least a message generated by one of the stations, and minislots, for sending, in case of collision between at least two messages, a corresponding available data slot reservation signal, and of a common minislot pool also including minislots for sending, in case of collision between at least two reservation signals, another available data slot reservation signal.

The present invention also relates to communication stations in which said control method can be implemented, and more particularly to communication stations for a transmission of messages between a plurality of stations, said stations being interconnected via a communication channel comprising at least an upstream channel at least partially shared by said stations and said upstream channel being divided into successive frames of predetermined length consisting of message slots, each of which includes a data part, for the transmission of at least a message generated by one of the stations, and minislots, for sending, in case of collision between at least two messages, a corresponding available data slot reservation signal, and of a common minislot pool also including minislots for sending, in case of collision between at least two reservation signals, another available data slot reservation signal.

BACKGROUND OF THE INVENTION

Referring to FIG. 1, there are shown an earth station called a hub 1 and several frames I, . . . I+R, I+R+1, of a communication channel 2 shared by a plurality of ground stations (not shown). The hub, which may be one of these stations, constitutes a master station that performs a function of monitoring an upstream link of said channel, for the transmission, from one ground station to another, of packets of information in time slots selected randomly. As shown in FIG. 2, the protocol of communication between the stations is the following: each frame, of t(f) seconds in length, comprises a given number K of message slots 21(1) to 21(K) and a particular slot called common minislot pool or CMP. Each message slot (or data slot) has a time duration of t(m) and is composed of a data part (or data message DM) and K minislots, and the CMP is also composed of K minislots but without any data part. The time durations of the minislots of each message slot are very small compared to t(m), and these minislots occur at the beginning of the message slot.

When a message has to be transmitted from a first station to a second one, this message has to wait until the beginning of the next frame, here called frame I. It is noteworthy that, (before frame I, all the stations had received from the hub a feedback message or signal indicating which slot is free for new messages or for messages which had sent successfully a transmission request. If there are indeed some available message slots, the emitting station chooses randomly one of these slots and transmits its message in the data part of this slot. Together with this message transmitted in the data part, an associated transmission request is placed in one of the minislots (randomly chosen) of the concerned message slot, in order to announce the reservation of said slot. If there are no available slot, this station puts a transmission request in one of the minislots of the CMP.

After a given propagation delay (for instance 0.27 seconds as indicated in FIG. 1, in the case of a link via a satellite), the hub receives all the messages and transmission requests that have been sent in the frame I. It then detects collisions in the data slots and calculates the set of slots that are available (or available slot set ASS) in the frame I+R+1 that just follows the frame during which all the stations have received from the hub the feedback messages (all the stations that have transmitted in frame I being assumed to receive their feedback before frame I+R+1). A slot (in said frame I+R+1 for instance) is said to be available (i.e. not reserved) if no request has announced a retransmission in this slot, or on the contrary reserved if one (and only one) request has announced such a retransmission. If more than one request announce a retransmission in the same slot, no successful transmission is possible and this slot is let free for new arrivals, while retransmission requests now occur in the CMP.

After having calculated the available slot set (ASS), i.e. the set of slots available for new messages, the hub broadcasts to all the stations both said ASS and the status of each message slot in the frame (empty, or available=E; used with success=S; collision=C):

(1) if a station has sent a message in a data slot and receives a feedback signal S (successful transmission), it exits the protocol;

(2) if a station receives a feedback signal C (collision) or has sent a request in the CMP, it reads the ASS broadcasted by the hub:

(a) if the reference number of the minislot does not correspond to any of the slots of the ASS, it means that this number corresponds to a reserved slot and that the request for retransmission has been successful: the station sends its message in this reserved data slot, and will then exit the protocol;

(b) if the reference number of the minislot corresponds to a slot of the ASS, it means that the request has failed, and this slot is available for new messages, while the concerned station has to use the CMP for retransmitting its request.

Such a contention-based protocol, suited to low traffic conditions and well adapted to applications involving the generation of short constant length messages (for instance to interactivity applications such as user authentication for pay-per-view or multimedia data base consultation), is described for example in the U.S. Pat. No. 4,641,304. With this protocol, called ARRA for Announced Retransmission Random Access, as a signal has been placed in an accompanying, randomly choosen minislot (together with the message transmitted in the data slot) in order to announce the reservation of this corresponding slot in the subsequent frame if said message collides with another, messages having collisions in their data part will retransmit in the announced slot if the announcement does not encounter collision. In case both the data part and the announcement part suffer collisions, the station tries to put a new announcement in one of the minislots of the CMP. It is therefore clear that, while the probability of collision in the data part of a slot is limited to the first access trial (avoiding further collisions with other messages), collisions in announcement minislots can occur more than once, considering either the minislot field in each slot or the CMP at the beginning of each frame. Furthermore, at higher channel loading conditions, repetitive collisions occur in the CMP field, between stations having new messages to transmit and stations having suffered collisions in both their data and minislot fields. Since the number of minislots in the CMP is limited to K, collisions in this field are never resolved. The protocol saturates when doubly collided messages (i.e. suffering collisions in both the data field and the minislot field) are not authorized to access the available slots of a frame and these available slots are consequently wasted. The efficiency of this protocol, defined by its capacity or maximum normalized throughput, is then limited to a value of about 0.42 at most, which means that less than 50% of the data slots are successfully used.

SUMMARY OF THE INVENTION

A first object of the invention is therefore to propose an improved protocol reducing the probability of collisions in the minislots and increasing the performance behaviour of the protocol in terms of average throughput and delay for higher network loading conditions.

To this end the invention relates to a method as defined in the preamble of the description and wherein said method includes a recycling step based on an analysis of an information related to the number of encountered collisions.

The basic idea of said method is to use the wasted data slots to resolve collisions in the CMP, by allowing at least some of the contending messages to reaccess the data field of an available message slot, a priority being then given to these messages.

In an advantageous embodiment, it must be noted that, in said method, the recycling step comprises a first sub-step for analyzing an information related to the number of encountered collisions and, if said number is greater than a predetermined threshold, a second sub-step for recycling the messages corresponding to the collisions by giving them a higher priority with respect to newly generated messages.

Another object of the invention is to propose a communication station equipped in order to carry out said method.

To this end the invention relates to a communication station as defined in the preamble of the description and wherein said station includes a reception sub-assembly comprising:

(a) an analysis circuit, provided for defining an information related to the number of encountered collisions;

(b) a processing circuit, provided for comparing said number to a predetermined threshold and, only if said number is greater than said threshold, recycling the messages corresponding to the collisions by giving them a higher transmission priority than to newly generated messages.

The invention may also relate to a communication station for a transmission of messages between a plurality of stations, said stations being interconnected via a communication channel comprising at least an upstream channel at least partially shared by said stations and said upstream channel being divided into successive frames of predetermined length consisting of message slots, each of which includes a data part, for the transmission of at least a message generated by one of the stations, and minislots, for sending, in case of collision between at least two messages, a corresponding available data slot reservation signal, and of a common minislot pool also including minislots for sending, in case of collision between at least two reservation signals, another available data slot reservation signal, said communication station comprising a generation sub-assembly, provided for generating messages that have to be transmitted, and a transmission sub-assembly, wherein said station also includes means for yielding an information related to the number of encountered collisions.

The tests realized with such stations have shown an improvement of the throughput performance, the throughput value reaching for example a value of about 0.52 for K=8.

BRIEF DESCRIPTION OF THE DRAWINGS

The present invention will be now described in further detail with reference to the accompanying drawings, in which.

DETAILED DESCRIPTION OF THE INVENTION

Figure 1:
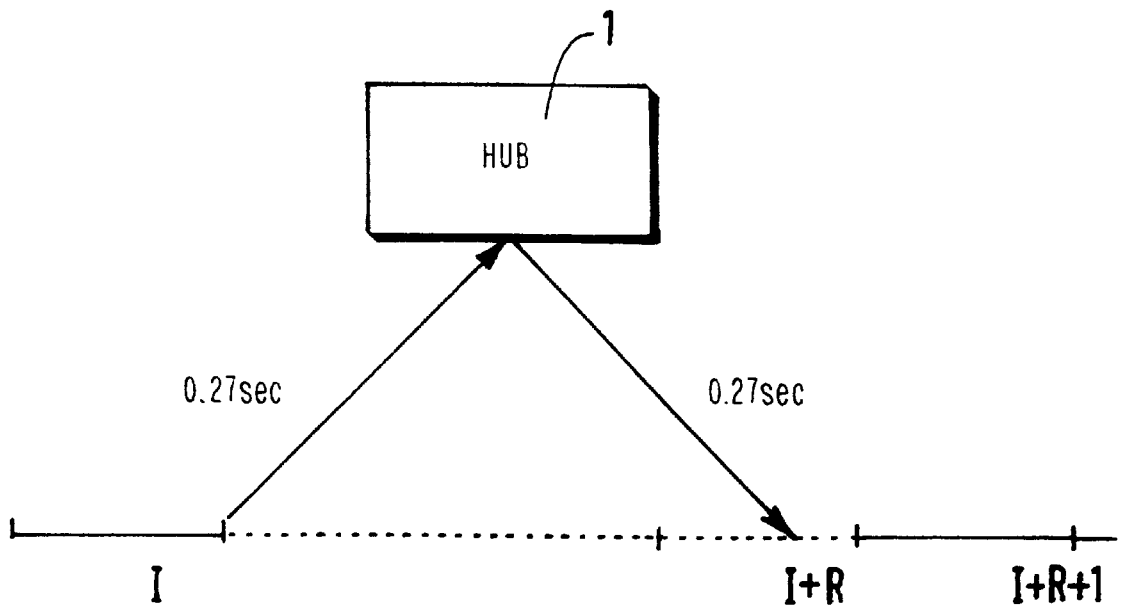
FIG. 1 shows schematically a conventional communication channel divided into successive frames and a master station provided for monitoring the transmission of messages between stations via said communication channel.
Figure 2:
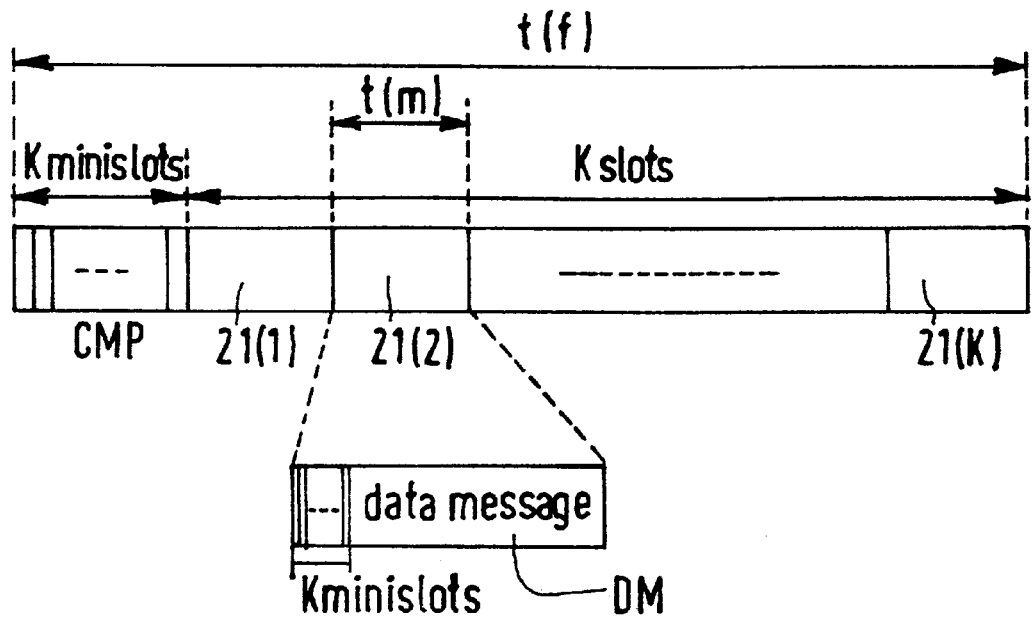
FIG. 2 illustrates the structure of each frame of the conventional channel shown in FIG. 1.
Figure 3:
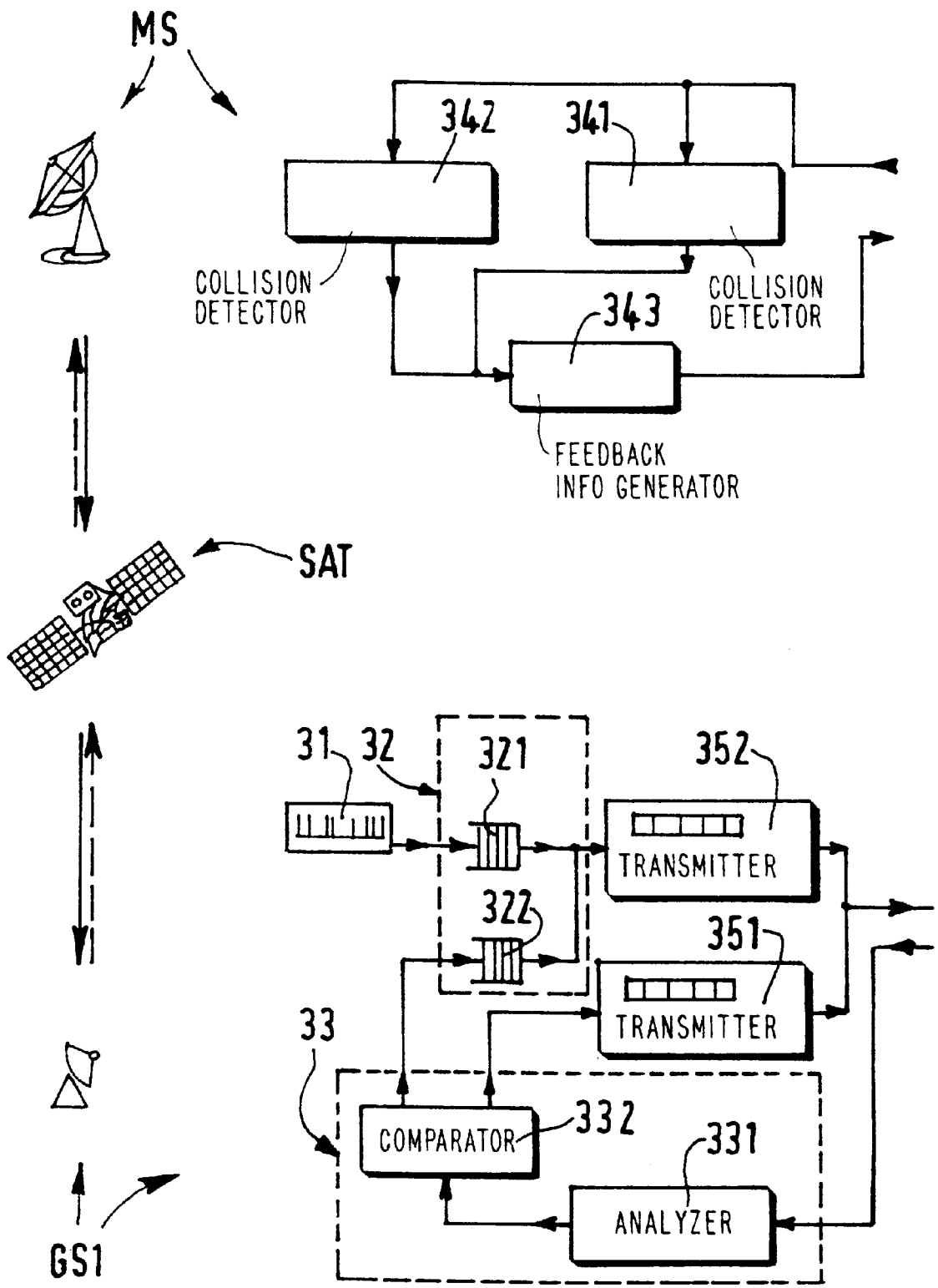
FIG. 3 shows a network configuration including ground stations GS1 communicating with a master station MS, or hub, via a communication channel including a satellite SAT according to the present invention.

As previously described, the frame structure is divided into K data slots, each of which is divided in turn into a data part (or field) and K minislots, with a common minislot pool CMP (also composed of K minislots) marking the beginning of the frame. Referring to FIG. 3, a ground station GS1 generates a message and sends it by means of one of the available slots in the next frame (the set ASS of said available slots being indicated by a feedback information broadcasted by the hub MS in order to be received by all ground stations before the beginning of each frame) and simultaneously introduces a reservation signal in an accompanying minislot. This signal is intended to announce the reservation of a slot (the K-ith slot for an accompanying minislot $K_i$) in the subsequent frame if said generated message collides with another one generated by another station. All the reservation announcements that succeed to arrive to the hub without suffering any collision with other announcements then allow to exclude corresponding reserved slots from the available slots set ASS. If there is no available slot, said station GS1 tries to introduce a similar announcement signal in one of the minislots of the CMP.

According to the invention, each concerned station (GS1 in this case, but anyone of the stations has a similar structure) includes the following equipment: a message generation sub-assembly 31, a transmission sub-assembly 32, and a reception sub-assembly 33. The sub-assembly 31 is a traffic generator, following in the described embodiment a Poisson process with an arrival rate of $\lambda$ messages per slot duration, $\lambda$ being identified as the overall system loading parameter. The transmission sub-assembly 32 comprises two queues 321 and 322, the first of which is provided at the output of the sub-assembly 31 for storing new messages, while the second one is provided for storing (as will be seen) messages that have to be recycled. In the same time, these queues also allow to delay the messages in order to access the right slot in the frame. The reception sub-assembly 33 is provided for organizing a transmission or retransmission process and comprises an analysis circuit 331 that receives the feedback information broadcasted by the hub for indicating at the beginning of each frame the available slots and the collided ones. This circuit 331 is followed by a comparison circuit 332 provided for counting the number of collisions or unsuccessful transmissions in the minislots and comparing it to a threshold corresponding to a predetermined number of allowed collisions:

(a) if said number is lower than or equal to this threshold, all the generated messages succeed in finding a transmission slot in the ASS (in FIG. 3, this situation corresponds to the first illustrated mode of transmission, in a reserved slot, via the transmission stage 351);

(b) if said number is greater than the threshold, the newly generated messages are directed towards the low priority queue 321 and thus delayed, while the messages corresponding to retransmission announcements are directed towards the high priority queue 322, i.e. recycled to be transmitted before said new messages (in FIG. 3, this situation corresponds to the second illustrated mode of transmission, via the transmission stage 352).

Each station has in the described example the access possibility for only some recycled messages per frame (for instance one), but the invention also applies in more general cases considering an increased possibility for each station for recycling its messages. Moreover it must be noted that the invention also applies when said station, as described in the preamble of the description, comprises a generation sub-assembly, provided for generating messages that have to be transmitted, a transmission sub-assembly, and means for yielding said information related to the number of encountered collisions.

During the whole set of operations, the hub MS has monitored the process by carrying out two types of operations: the detection of collisions or unsuccessful transmissions and the generation of the corresponding feedback information. These operations are implemented in a first collision detector 341, provided for detecting a possible collision of messages in the data field of a slot, in a second collision detector 342, provided for detection possible collisions of transmission requests in the minislots field of a slot or in the CMP, and in a feedback information generating circuit 343, provided for transmitting to the stations the information concerning the available slots for the access of new or recycled messages to the communication channel. The available set ASS broadcasted by the circuit 343 and arriving at the beginning of each frame indicates, as previously said, the available slots for new and recycled messages.

Evaluation tests of the performance behaviour of the described method for varying network loading conditions have shown that varying the value of K (from 2 to 8 slots per frame for instance) improves the value of the throughput. The value of the number M of frames on which retransmission announcements can be relaxed appears to be more significant at smaller values of K than at greater ones. Considering the parameter C that determines the maximum number of collisions after which the messages are recycled, a convenient value is C=3. As the proposed method increases the throughput performance up to 0.52 versus 0.42 when using the previously known protocol, it may be an appropriate solution for implementation in very small aperture terminal (=VSAT) satellite networks, in order to have a direct access to the satellite transponder, in the minimum delay access and with a satisfying throughput, or also for all multimedia broadcast applications requiring a low interactivity level (of the type inquiry/response to data bases) between service providers and system subscribers.

We claim:

1. A method of controlling transmission of messages between a plurality of stations, said stations being interconnected via a communication channel comprising at least an upstream channel at least partially shared by said stations, said method comprising the steps of:

dividing said upstream channel into successive frames of predetermined length, each of said frames comprising message slots and a common minislot pool, wherein each of said massage slots includes a data part and minislots, transmitting at least a message generated by one of the stations in said data part, sending reservation signals in said minislots in case of collision between at least two messages, said reservation signals indicating available data slots, sending common reservation signals in said common minislot pool in case of collision between at least two of said reservation signals, said common reservation signals indicating usable data slots, recycling the messages corresponding to the collisions for retransmission based on an analysis of an information related to a number of encountered collisions.

2. A method according to claim 1, wherein said recycling step comprises a first sub-step for analyzing an information related to the number of encountered collisions and, if said number is greater than a predetermined threshold, a second sub-step for recycling the messages corresponding to the collisions by giving them a higher priority with respect to newly generated messages.

3. A communication station for a transmission of messages between a plurality of stations, said stations being interconnected via a communication channel comprising at least an upstream channel at least partially shared by said stations, said upstream channel being divided into successive frames of predetermined length, each of said frames comprising message slots and a common minislot pool, wherein each of said message slots includes a data part and minislots, said data part being for the transmission of at least a message generated by one of the stations, and said minislots being for sending, in case of collision between at least two messages, reservation signals which indicate available data slots, said common minislot pool including common minislots for sending, in case of collision between at least two of said reservation signals, common reservation signals which indicate usable data slots, wherein said station includes a reception sub-assembly comprising:

an analysis circuit for defining an information related to the number of encountered collisions;

a processing circuit for comparing said number of encountered collisions to a predetermined threshold and, if said number of encountered collisions is greater than said threshold, recycling the messages corresponding to the collisions by giving them a higher transmission priority than to newly generated messages.

4. A communication station according to claim 3, wherein said reception sub-assembly further comprises a first queue and a second queue connected in parallel, the first queue receiving the newly generated messages and said processing circuit then recycling the messages corresponding to the collisions in the second queue and giving to the content of said second queue a higher transmission priority than to the content of the first queue.

5. A communication station for a transmission of messages between a plurality of stations, said stations being interconnected via a communication channel comprising at least an upstream channel at least partially shared by said stations, said upstream channel being divided into successive frames of predetermined length, each of said frames comprising message slots and a common minislot pool, wherein each of said message slots includes a data part and minislots, said data part being for the transmission of at least a message generated by one of the stations, and said minislots being for sending, in case of collision between at least two messages, reservation signals which indicate available data slots, said common minislot pool including common minislots for sending, in case of collision between at least two of said reservation signals, common reservation signals which indicate usable data slots, said communication station comprising a generation sub-assembly, provided for generating messages that have to be transmitted, and a transmission sub-assembly, wherein said communication station further includes means for yielding an information related to the number of encountered collisions.

* * * * *